United States Patent [19]

Lieberman et al.

[11] 3,904,487

[45] Sept. 9, 1975

[54] ANODIC STRIPPING VOLAMMETRY AND APPARATUS THEREFOR

[75] Inventors: Stephen H. Lieberman; Alberto Zirino, both of San Diego, Calif.

[73] Assignee: The United States of America as represented by the Secretary of the Navy, Washington, D.C.

[22] Filed: Oct. 29, 1974

[21] Appl. No.: 518,539

[52] U.S. Cl. ............................ 204/1 T; 204/195 H

[51] Int. Cl.[2] ........................................ G01N 27/42

[58] Field of Search ........... 204/1 T, 195 H, 195 R; 324/29

[56] References Cited

OTHER PUBLICATIONS

Wayne R. Matson et al., Analytical Chemistry, Vol. 37, No. 12, pp. 1594–1595, (1965).

S. P. Perone et al., Jour. Electroanalytical Chem., Vol. 12, pp. 269–276, (1966).

T. M. Florence, Jour. Electroanalytical Chem., Vol. 27, pp. 273–281, (1970).

*Primary Examiner*—G. L. Kaplan

*Attorney, Agent, or Firm*—Richard S. Sciascia; Ervin F. Johnston; Thomas Glenn Keough

[57] ABSTRACT

An apparatus for and a method of determining the presence and concentration of trace metals in seawater relies on anodic stripping voltammetry. A tubular mercury-graphite electrode is suitably coupled to receive a flowing mercury plating solution and a thin film of mercury is deposited on the inner surface of the electrode when a plating potential is coupled to the electrode. Next, a seawater sample is pumped through the electrode and trace metals are reduced onto the active mercury film when the plating potential is reconnected to the electrode. After a predetermined time, the potential is shifted to a scanning potential gradient. At discrete levels within the scanning potential gradient certain ones of the trace metals are stripped from the active metal film and the values of the currents at these levels are monitored and recorded. From the magnitudes of the currents at the discrete potential levels, the concentration of individual ones of the trace metals is determined. Zinc, cadmium, lead and copper concentrations are readily observable when their stripping potentials are embraced within the breadth of the scanning potential gradient. Increasing the scanning potential allows the stripping away of the mercury film. A following analysis merely calls for switching the seawater sample back to a container and reconnecting the mercury plating solution to the electrode. Another active mercury thin film is deposited on the electrode and trace metals are deposited for a following stripping operation. Thus, the disclosed method and apparatus are capable of nearly real-time iteration to enable a more accurate determination of trace metal concentrations. The degree of accuracy is enhanced since the flow rates of the plating solution and the sample are controlled, the magnitudes of the plating and stripping potentials are controlled and the thickness of the active mercury film is precisely regulated to ensure consistent parameters for a number of sample analyses. In addition, because the apparatus operates as a closed system, outside influences which might otherwise degrade reliability, are eliminated.

19 Claims, 12 Drawing Figures

ANODIC STRIPPING VOLAMMETRY AND APPARATUS THEREFOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Currently there exists a need for a direct rapid method of determining the concentration of trace metals in the marine environment. Scientists have looked to polarography for such a determination. Polarography is a well known method of measuring potential difference-current relationships in solutions by means of a polarized microelectrode and to allow an interpretation of data or records so obtained in terms of the nature and behavior of many substances. One meaningful interpretation of the data is that the presence and concentration of various trace metals in solution can be determined. Thus, the form of polarography called anodic stripping voltammetry has been employed with a degree of success to determine trace metal concentration. Briefly, anodic stripping voltammetry relies on concentrating the metal or metals of interest by cathodic deposition at an electrode under controlled conditions for a known length of time. Following the concentration step, themetals are stripped away from the electrode, usually by scanning the electrode potential anodically and observing the current peaks caused by reoxidation, that is, the removal of electrons, of the metal into the solution. The peak potential in a given medium is characteristic of the particular trace metal being oxidized and the height of the current peak is proportional to concentration of the particular trace metal. Generally speaking, any other metal which exists in the solution will not be oxidized at another metal's discrete potential and will not register. An exception to this general statement is that certain amalgams may be simultaneously stripped. However, the contemporary systems relying upon anodic stripping voltammetry leave something to be desired in terms of accuracy and continuous, reliable operation.

To an extent, the marginal results are due to the mode of system operation and the limitations of the electrodes. A dynamic system where the solutions are washed over or pumped through an electrode has been found to provide better trace metal analyses than a static system where the electrode is immersed in an uncirculating solution.

One of the better electrodes is the hanging mercury drop electrode. This microelectrode consists of a drop of mercury usually obtained by extruding drops from a capillary onto a platinum wire. A main disadvantage of a hanging mercury drop electrode is that because it is spherically shaped, the drop has a low surface-to-volume ratio. Much of the metal deposited during the concentration does not get reoxidized during the stripping step until it diffuses to the electrode's surface. This, in turn, reduces the efficiency of plating and causes a tailing of the stripping peaks attributed to different trace elements. A variation from the hanging mercury drop electrode is a mercury thin film deposited on the surface of a solid metal substrate. The substrates usually are an amalgamated surface, an alloy of mercury which assures the plating of the mercuric ion onto its surface. A limitation becomes apparent with this type electrode due to the inability to deposit the mercury thin film uniformly on the substrate. A film of uneven, or rather. of excessive depth causes an increase of the hydrogen reduction current which interferes with the peak currents otherwise attributed to the stripping of the trace metals. Somewhat better results were obtained using a mercury covered graphite electrode. While the inert graphite did not overly influence the stripping current peaks, the tendency for there being a nonuniform metal film influenced accuracy. In addition, this electrode is more apt to be exposed to oxygen with a consequent deterioration of the film.

Although tubular graphite electrodes have been used with a degree of success to measure electrolysis currents, they have not been used for anodic stripping. Yet, the advantages of such electrodes are that there is a remarkable resistance toward surface oxidation, the electrode's well defined geometry holds up under prolonged use, and it serves as a suitable channel for stirred solutions. However, the tubular graphite electrodes are easily attacked by a variety of oxidizing agents resulting in the chemisorption of a considerable amount of oxygen. The influence of chemisorbed oxygen alters the electrode's surface reactions, such as acidity, polarity, cation exchange capacity etc. In all of the aforedescribed electrodes their operational life is relatively short since the discrete peak currents from the various trace metals strip away or otherwise oxidize the electrode's active surfaces. After the electrode's active surfaces have deteriorated beyond a certain point, erroneous readings are given and the surfaces must be revitalized for responsive readings. Usually this revitalization process, the cleaning or replating of an active metal film, is time consuming and means that the entire voltammetry process must come to a halt. Thus, there exists in the state-of-the-art a continuing need for a reliable electrode and an apparatus and method for permitting an on-site, uninterrupted trace metal determination in a number of sample solutions.

SUMMARY OF THE INVENTION

The present invention is directed to providing an apparatus for and a method of measuring the presence and concentration of trace metals in a sample solution flowing through an active electrode and a reference electrode. First, from a circulating active metal plating solution there is the deposition of an active metal film onto the inner surface of a tubular mercury-graphite electrode. A sample solution having trace metals is fed through the active electrode and a potential is applied across the electrode to reduce the trace metals onto the active metal film. Next, the potential is changed across the active electrode and various trace metals are stripped away at discrete potential levels within the scanned potential gradient. The magnitudes of the currents at the discrete levels indicate the presence and concentration of various trace metals and these values are monitored on interconnected instrumentation. Immediately thereafter another sample analysis is performed by the device of the invention by simply recycling the active metal plating solution through the tubular graphite-mercury electrode and interconnecting a proper plating potential to the electrode for reducing an active metal film on its inner surface. Next, the active metal plating solution is switched from the electrode and the sample solution is pumped through the electrode where the trace metals in the sample solution are reduced on the active metal film. The scanning and stripping away of the trace metals follow as stated above to allow an in-situ analysis of the solution.

An object of the invention is to provide a method of measuring the presence and concentration of trace metals in a sample solution.

Another object is to provide a method of determining the concentration of trace metals employing the anodic stripping voltammetry process.

Still another object is to provide a method of applying and maintaining a consistently active mercury thin film on a graphite electrode.

Another object is to provide a method for determining the concentration of trace metals employing a tubular electrode in a flowing stream of a sample solution.

Still another object is to provide a method for determining trace metal concentrations in solutions which lend itself to providing continuous measurements in the field.

Yet another is to provide a method which ensures a consistently active mercury thin film on the electrode by alternately circulating a mercury plating solution and a sample solution through the electrode.

Still another object is to provide a method of ensuring a relatively uniform thin active metal film on the inside of the graphite electrode to improve the accuracy of trace metal determination.

Yet another object of this invention is to provide a consistently active thin metal film due to the solutions's being pumped through the active electrode at a predetermined flow rate.

An object of the invention is to provide an apparatus for measuring the presence and concentration of trace metals in a sample solution.

Another object is to provide an apparatus which is operatively interconnected for recirculating an active metal plating solution and a sample solution sequentially through an active electrode.

Another object is to provide an apparatus for determining trace metal concentration which is capable of analysing samples in the field.

Still another object is to provide an apparatus for determining trace metal concentration which ensures the depositing of a thin active metal film on the interior of a tubular graphite electrode to increase sensitivity and reliability.

Another object of the invention is to provide an apparatus for determining trace metal concentration which avoids the possibility of mixing the plating solution and the sample solution.

Yet another object of the invention is to provide an apparatus for determining trace metal concentration which allows for repetitive analysis of a sample solution.

Still another object is to provide an apparatus for determining trace metal concentration without excessively increasing the hydrogen reduction current during sample analysis.

These and other objects of the invention will become more readily apparent from the ensuing specification taken together with the drawings.

DESCRIPTION OF THE PREFERRED EMBODIMENT

Figure 1:
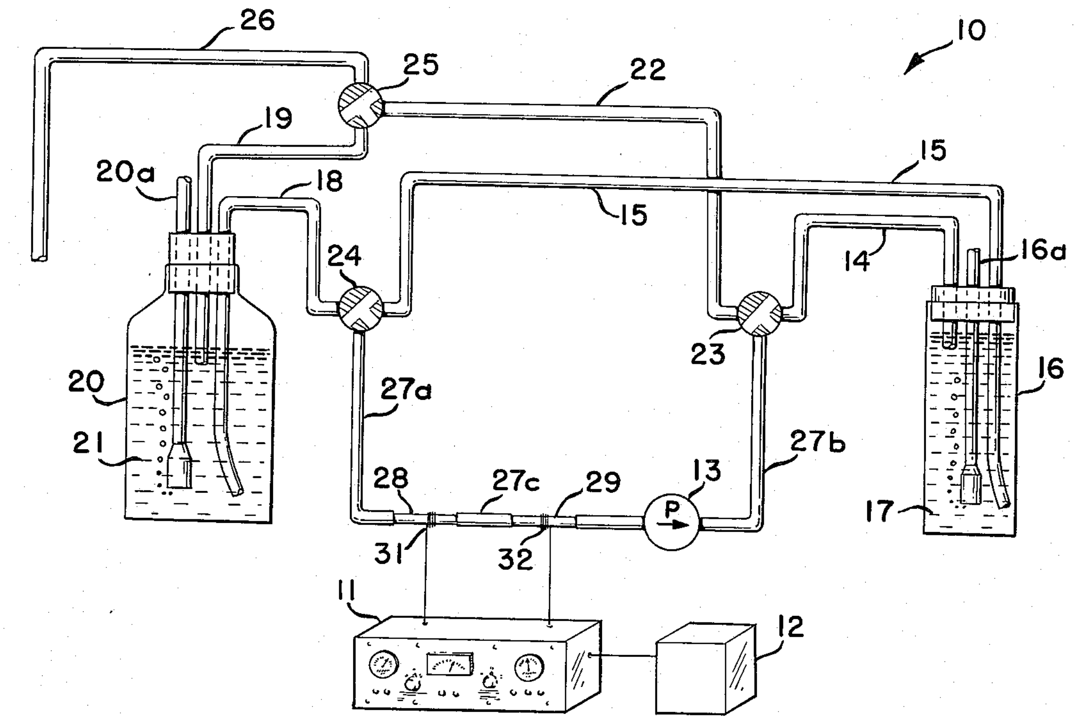
FIG. 1 is a schematic representation of the apparatus for determining trace metal concentration.

Referring now to the drawings, and in particular FIG. 1, there is shown the apparatus 10 by which an accurate analysis of trace metal concentration in a seawater sample is performed. This anodic stripping voltammetry apparatus system employs a commercially marketed Heath chopper-stabilized controlled-potential polarography system 11 to allow the recording of stripping currents on a Sargent-Welch Model SRG strip chart recorder 12. Because the system and recorder are well known and widely used by those skilled in this field of the art, they are depicted in block diagram form to avoid belaboring the obvious. Among the several polarography systems and strip chart recorders commercially available for recording current-potential traces of trace metals, the Heath and Sargent-Welch devices were found to be more suitable for the recording of current-potential traces zinc, cadmium, lead and copper, zinc being the trace metal of greatest interest. This polarography system and recorder have been used to a degree of success in static and dynamic analyses in the laboratory but now, due to this invention, more representative, real-time analyses in the field are a reality.

A variable speed pump 13 impells solutions through a network of tubing. A pump of the type marketed by Masterflex e.g., a Cole Parmer No. 7545-15, functioned quite suitably to impell precisely regulated flow rates through the tubing network.

The tubing network includes a first and a second section of tubing 14 and 15 which communicate with a container 16 filled with a sample solution 17. A length of piping 16*a* reaches below the surface of the solution to allow its purging with nitrogen prior to the analyses procedure. Another pair of tubing sections 18 and 19 are in fluid communication with a container 20 filled with a plating solution 21. Similarly, a length of piping 20*a* extends inwardly to purge unwanted oxygen molecules from the plating solution. The sample solution is ordinary seawater and the plating solution is a mercury plating solution, the exact composition of which will be elaborated on below.

A single tubing section 22 extends between stopcocks 23 and 25 and a drain tubing section 26 is provided to allow the venting of a portion of either the sample solution or the plating solution or a combination of both, as will be explained later. A third stopcock 24 is included in the tubing network and lastly, feeder tubing sections 27*a* and 27*b* and tubing section 27*c* couple a tubular active electrode 28 and a tubular reference electrode 29 together to create a completely closed system.

In one embodiment of this invention all of the tubing sections were of the type commercially marketed under the trade designation of "Formula 3603 Tygon" tubing three-sixteenths of an inch inner diameter and a three-eighths of an inch outer diameter. This particularly sized tubing was sufficient to provide the needed flow rates of the sample and the plating solutions Stopcocks 23, 24 and 25 were three way stopcocks of the type marketed by the Corning Corporation under the trade designation of "Pyrex" stopcocks using Dupont Corporation "Teflon" plugs.

Figure 4:
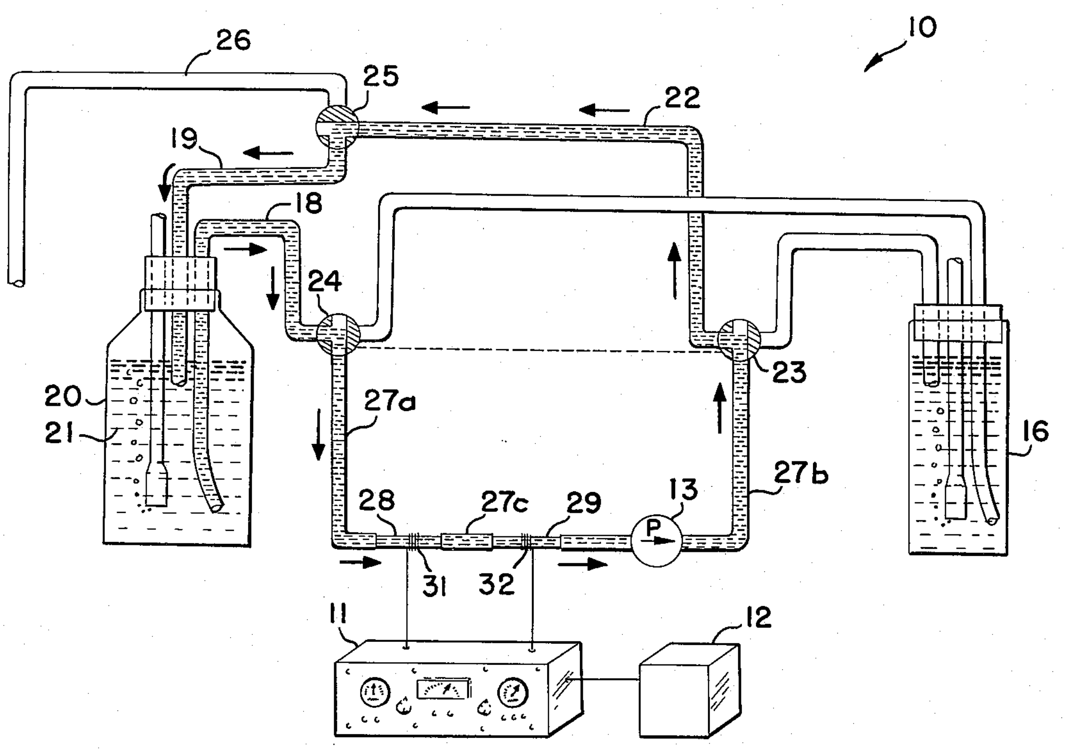
FIG. 4 shows the circulation of the plating solution through the apparatus.

Noting FIG. 4 which depicts the plating of the active electrode in a manner to be explained below, stopcock 24 is switched to allow pump 13's drawing in of plating solution 21 through tubing section 18, tubing section 27*a*, 27*b* and 27*c*, and through the two electrodes, 28 and 29. Simultaneously, stopcock 23 is actuated to allow the plating solution 21 to continue flow-through tubing section 22 toward stopcock 25. This stopcock, in turn, is coactuated to return the plating solution to container 20 via tubing section 19. The closed circuit loop thusly described avoids the possibility of contaminating the plating solution.

Figure 5:
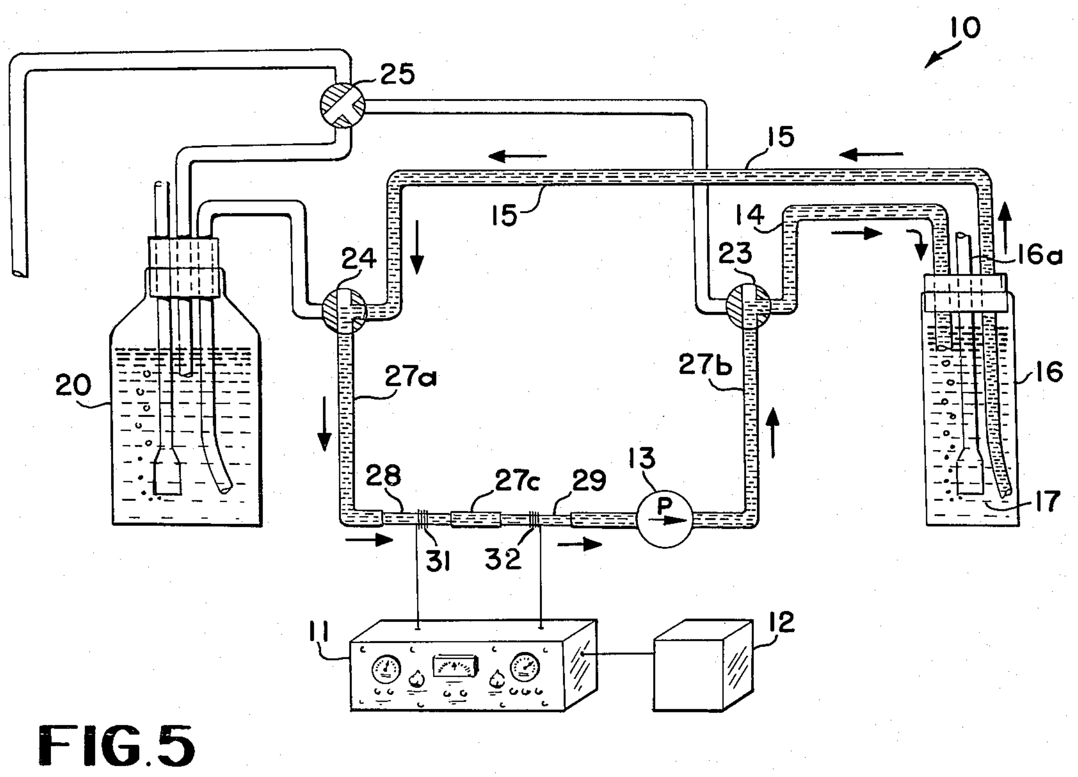
FIG. 5 shows the circulation of the sample solution through the apparatus.

In like manner, noting FIG. 5, when the sample solution is to be fed through the two electrodes 28 and 29, stopcock 24 is rotated to provide a passageway for sample solution 17 which has been drawn out from container 16 through tubing section 15. Continued pumping by pump 13 pulls the sample solution through tubing sections 27*a*, 27*b* and 27*c* and the two electrodes 28 and 29. The sample solution continues on through stopcock 23 which has been appropriately rotated to feed the sample solution into container 16 via tubing section 14. Here again, the flowing of the sample solution through the two electrodes occurs at a closely regulated, pumped rate and the system defined is a closed system which avoids the possibility of contaminating the sample solution.

Figures 2, 3A:
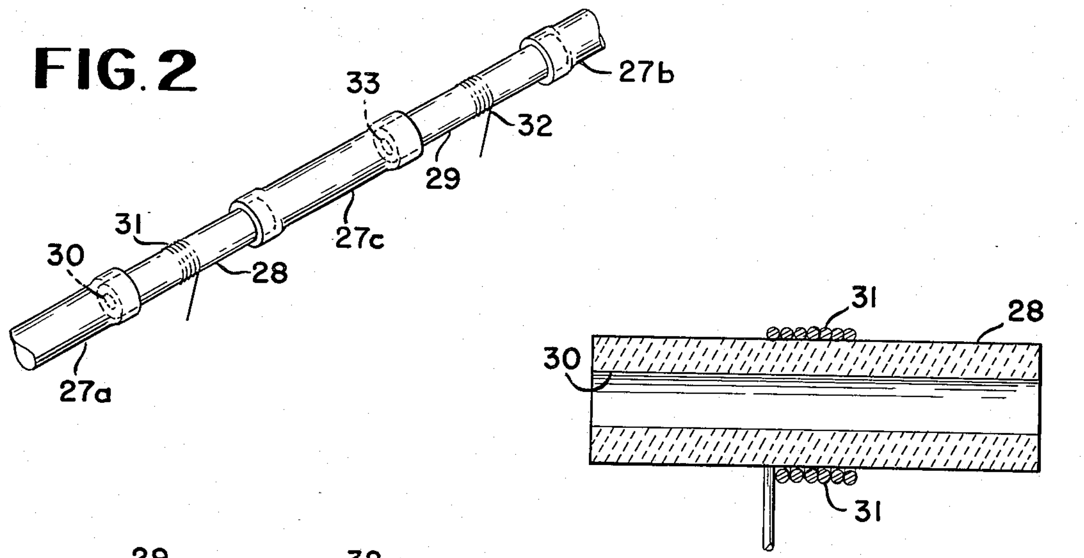
FIG. 2 depicts the active electrode and the reference electrode.
FIG. 3*a* shows a cross-sectional view of the tubular mercury-graphite electrode.
Figure 3B:
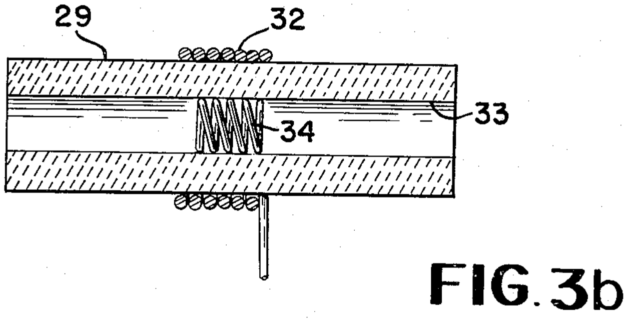
FIG. 3*b* is a cross-sectional schematical representation of the reference electrode.

The highly satisfactory results of the system thusly described is owed in part to the improved design of active electrode 28, see FIG. 3*a*. A spectroscopic grade graphite rod having a one-fourth of an inch outer diameter is cut into a 2.5 centimeter length. A 0.32 centimeter hole 30 is bored in the rod and the interior is sanded with a fine sandpaper. A silver wire 31 is wrapped around the tube and sealed in place with an epoxy cement. The distal end of the silver wire is coupled to polography system 11 and serves to pass signals as will be explained. Next, the active electrode is impregnated under a vacuum with paraffin in a rotary evaporator two or more hours. After impregnation the electrode is removed from the molten wax but kept under a vacuum until the wax coat hardened. Optionally, the electrode is allowed to cure in a vacuum desiccator for at least 12 hours to get rid of any residual oxygen although this step is not overly critical. Prior to being installed in the system, the inner surface of the electrode is sanded and its hole 30 is polished.

Installation into the system merely calls for press fitting the electrode into exposed ends of sections of tubing 27*a* and 27*c*.

A reference electrode 29 was fashioned from a graphite tube having the same dimensions as the active electrode. The reference electrode differs by having a silver wire coil 34 previously anodized in a Cl-solution coaxially mounted along the inner surface of the reference electrode's longitudinal bore 33. And similarly, a silver wire 32 is wrapped about and bonded onto the outside of the reference electrode for interconnection with polarography system 11. This electrode is pressed into the exposed ends of the section of tubing 27*c* and that portion of tubing which is coupled to the input of the variable speed pump 13.

As mentioned above, anodic stripping voltammetry relies upon there being a reduction of trace metals by cathodically depositing the metals of interest on an active electrode. The trace metals of interest in the present case are zinc, cadmium, lead and copper with zinc being the metal most of interest. When a potential of sufficient magnitude is impressed across an active electrode with respect to a reference electrode, trace metals are deposited. However, for a continuous or a sequential reduction of the trace metals, the active electrode must be, in fact, consistently active so that representative indications of trace metal concentrations are provided.

With this requirement in mind, the present invention has developed a technique by which a thin, active, metal film, a mercury film 35, is uniformly deposited on the inner walls of hole 30. The source of mercury film 35 is mercury plating solution 21 as it is fed through active electrode 28 while a suitable potential is coupled to it.

A standard mercury plating solution of $2 \times 10^{-5}$M is prepared by diluting appropriate portions of a $5 \times 10^{-3}$M stock solution. This plating solution is purged with nitrogen to remove unwanted oxygen from the solution and is poured into container 20.

Stopcocks 24, 23, and 25 are appropriately actuated to create a closed circuit which includes plating solution container 20, sections of tubing 18, 27*a*, *b*, and *c*, 22 and 19 along with the active electrode 28, reference electrode 29 and variable speed pump 13. After the pump is turned on and a predetermined flow rate is maintained, a flow rate of 160 ml per minute was found to be suitable, the plating solution is washed through both active electrode 28 and reference electrode 29.

Controlled potential polarography system 11 is actuated to impress a plating potential of −1.4 volts on active electrode 28 with respect to the potential on reference electrode 29. At the 160 ml per minute flow rate and during a five minute electrolysis, a uniform film of sufficient thickness was produced that will resolve the zinc peak currents from the hydrogen reduction wave. Longer plating times tended to create an excessively thick film which increases the hydrogen reduction current to interfere with accurate indications of trace metal concentrations. Of particular interest is the fact that the film thickness, and hence the effectiveness of the active electrode to depositing and a later stripping of the trace metals, is a function of the flow rate, the magnitude of the applied plating potential, and the concentration of mercury in the plating solution. As mentioned before, the 160 ml per minute flow rate, −1.4 plating potential, and at least $1 \times 10^{-5}$M $Hg(NO_3)_2$ solution were found to be satisfactory for depositing a suitable film.

The solutions sequentially fed through the active electrode frictionally react and strip away unwanted solid products, e.g., $Hg_2Cl_2$, $HgCl_2$ etc., which are found on the mercury film. This removal of solid products by friction is an integral part of the maintenance of the active stability of the electroce. Such electrode. stability leads to the high stability of the system. In other words the flow rate wears away excess mercury and solid products to maintain a consistently active mercury thin film.

Depositing a thin mercury film on the inside of the electrode from a plating solution is superior to adding a mercuric ion to the seawater sample and depositing the thin mercury film and the trace metals simultaneously. Replicate analyses of seawater spiked to $1 \times 10^{-7}$M in zinc and $1 \times 10^{-5}$M in mercury produced zinc peak currents that decreased with time. This is because when the mercuric ion is added to oxygen-free seawater, the mercuric ion precipitates. Therefore, a separate step involving the depositing of the thin mercury film from a plating solution and the depositing of the trace metals from the sample solution was devised to avoid the unwanted precipitation.

Figure 7:
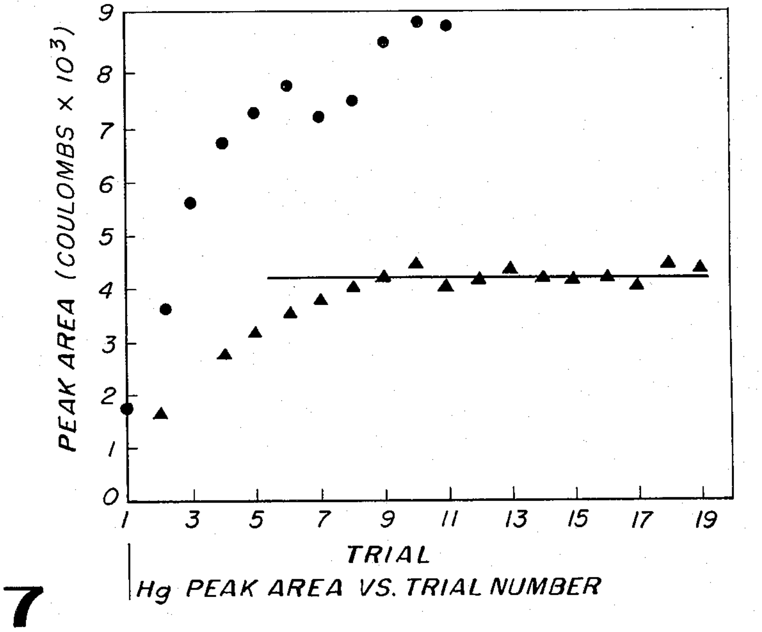
FIG. 7 presents a time history of mercury stripping peaks at two plating solution concentrations.

The magnitude of the stripping current peaks for mercury can be established with no more than a ±3.5 percent deviation. To elaborate, looking to FIG. 7, a plating solution having a concentration of $2 \times 10^{-5}$M of mercury pumped at a flow rate of 160 ml per minute for a five minute mercury deposition time, subsequently had stripping current peaks over a series of trials as indicated by the triangles. Another series of stripping peaks were established with a $4 \times 10^{-5}$M mercury solution noting the dots. At both concentrations the mercury stripping peaks increase for the first seven determinations and then appear to approach a steady state value. The reason that these peaks vary at all is that the oxidation of mercury is not complete. There is left an increasing residue of mercury after each stripping operation up to a saturation point, after about seven trials for the $2 \times 10^{-5}$M solution. After this saturation is reached, there will be little variation from the stripping peaks for Hg and the elements of interest which are deposited on the film. Optionally, there can be an alternate depositing and stripping away of Hg and the metals of interest for the seven trials until a steady state is reached. When the steady state is reached all of the stripping peaks stabilize.

Figure 4A:
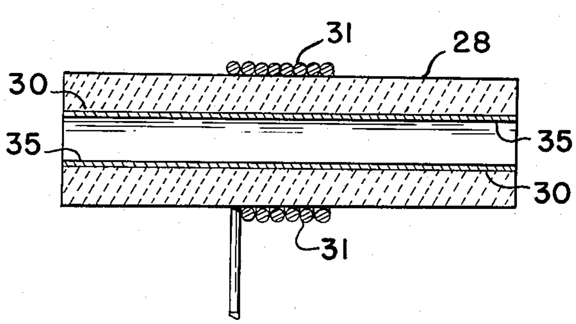
FIG. 4*a* is an exaggerated depiction of the depositing of a thin active metal film.

With the system described it becomes a simple matter to perform an analysis on a sample solution for the presence and concentration of zinc, cadmium, lead and copper. A fresh sample solution 17 is placed in container 16 and is purged with nitrogen to rid the sample of oxygen, etc. Meanwhile, the already purged mercury plating solution is flowing through active electrode 28 via the aforeidentified tubing sections and stopcocks. The flow rate is preferably maintained at 160 ml per minute and a plating potential of between −1.4 and −1.0 volts is impressed on active electrode 20 with respect to the potential applied to reference electrode 29. A uniform, thin, mercury film 35 is deposited on the active electrode after a predetermined time interval ranging from 2 to 5 minutes, see FIG. 4*a*, greatly exaggerated. Next, the potential from the polarography system 11 is removed and the system is switched from the mercury plating solution to the sample solution.

During the switching operation there is a small amount of mixing of the plating solution and the sample solution. Consequently, to eliminate addition of the chloride ion to the mercury plating solution, stopcock 25 was coupled to drain section of tubing 26. Thus, any admixture of the plating solution and the sample solution is purged from the system via stopcock 25 and drain section tubing 26.

Figure 5A:
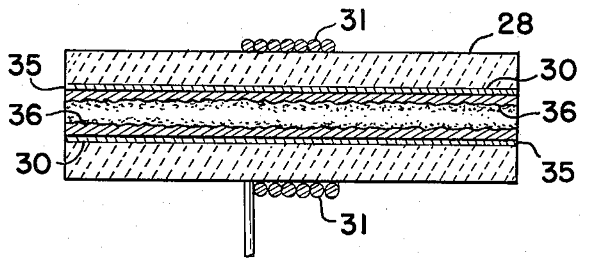
FIG. 5*a* is an exaggerated showing of the depositing of the trace metals on the thin active metal film.

The stopcocks are appropriately actuated to cause pump 13 to feed the sample solution through the system as outlined above and shown in FIG. 5. After a short interim period, usually no longer than 15 seconds, a potential having the same magnitude as the plating potential is reapplied to the active electrode for an identical interval from two to five minutes. During this time period, trace metals 36 are deposited on the active electrode, see FIG. 5*a*, greatly exaggerated.

Figure 5B:
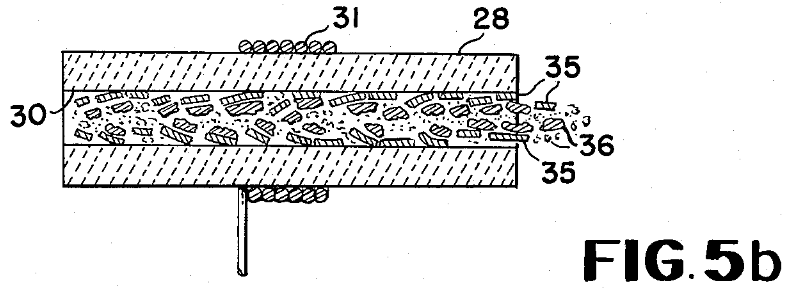
FIG. 5*b* is an exaggerated representation of the stripping away of the trace metals.
Figure 6:
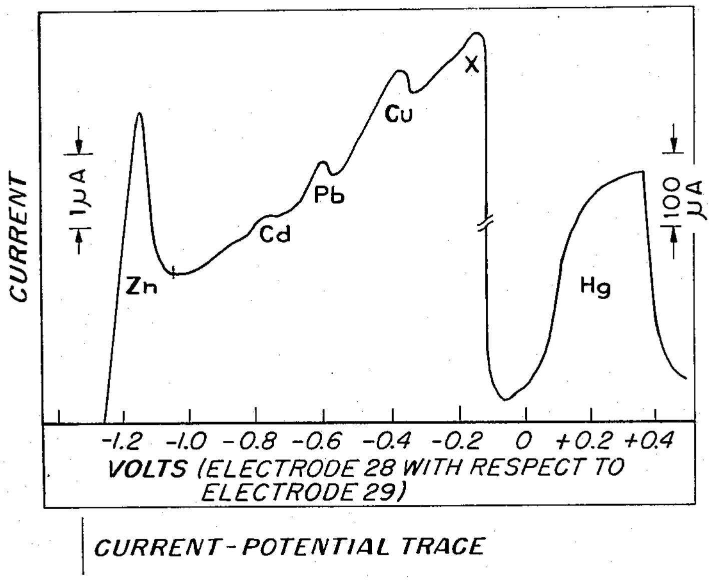
FIG. 6 shows a current-potential trace of a sample solution.

As the sample solution continues to flow, the potential is progressively scanned from −1.4 volts to at least a +0.5 volt magnitude with respect to the potential applied to the reference electrode. At discrete potential levels within the scanned potential gradient, certain ones of the trace metals are stripped from the active electrode, (see FIG. 5*b*, greatly exaggerated, and FIG. 6 for a current potential trace of a seawater sample flowing at 160 ml/min for five minutes with a 5 min Hg deposition from a $2 \times 10^{-5}$M solution at a 1 volt/min scan rate). This is because there is an electromotive force series among elements which causes individual metals to have their ions reduced at discrete potential levels. As the sample solution continues to flow, the trace metals and the mercury film are anodically stripped back into the sample solution as the potential varies from the −1.4 volts to the +0.5 volt level with respect to the reference electrode (in repeated analyses, the elements which produced current peak X in FIG. 6 could not be identified).

After the stripping operation, that is, after a complete potential gradient has been scanned, the stopcocks are appropriately switched to the position where the mercury plating solution is recirculated through the active electrode for a replating process.

Now all that remains to be done is to substitute a new sample solution system for an immediate analysis. Thus, this system and method can serve on site in the field for real-time analysis.

In addition, the determination of trace metal concentration is more valid because this invention operates in a closed cycle. The closed cycle is free from impurities and scientists and technicians performing on-going research can dispense with the necessity of collecting samples for a later rather questionable analysis. Seawater sample analyses are performed on a first hand basis when the information is more immediately relevant for the results desired.

Lab tests have shown that stripping away the trace metals into solutions other than the saline, seawater sample can improve the results of the analysis. This is largely because insoluble products are formed in a saline solution. There is evidence of the fact that stripping into a dissimilar non-saline solution produces a more representative indication of trace metal concentration since the mercurous chlorides are not present.

Figure 8:
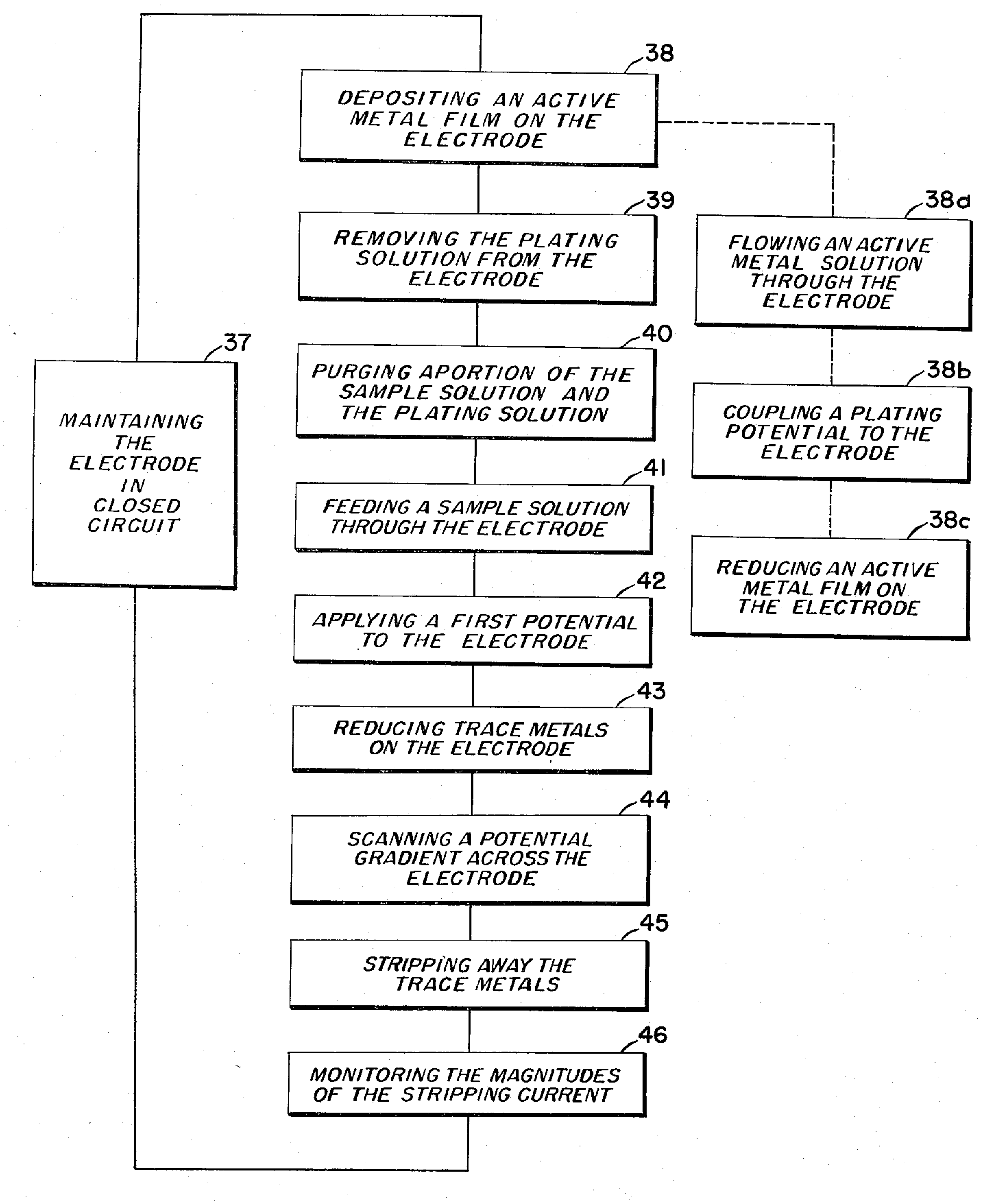
FIG. 8 represents a block diagram of the method of determining trace metal concentration.

From the foregoing there has been a thorough coverage of the apparatus by which the novel method of making valid trace metal analysis is performed. Noting FIG. 8*d* during the complete method there is a maintaining 37 of the electrode in a closed circuit within the system. A depositing 38 of an active metal film on the electrode includes the step of flowing 38*a*, an active metal solution through the electrode, a coupling 38*b* of a plating potential to the electrode, and a reducing 38*c* of an active metal film on the electrode. Next, there follows a removing 39 of the plating solution from the electrode and a purging 40 of a portion of the sample solution and the plating solution that were inadvertently admixed.

Now that the plating solution is removed from the system, there follows a feeding 41 of the sample solution through the electrode and an applying 42 of a first potential to the electrode, the first potential having the same potential as the plating potential earlier applied during the depositing 38 of the active metal film on the electrode.

As the first potential is applied to the electrode there is a reducing 43 of the trace metals on the electrode and, subsequently, a scanning 44 of a potential gradient across the electrode. The scanning causes a stripping 45 away of the trace metals at discrete potential levels to enable a monitoring 46 of these current peaks which provide indications of the trace metal concentrations of the discrete metals in the sample solution.

It should be emphasized that the concentrations of the trace metals as indicated by the magnitudes of their stripping peaks are estimated by comparing the magnitudes with the magnitudes of stripping peaks of a known, pre-established standard. The peaks obtained from a sample are not absolute; they must be compared with a standard.

Obviously, many modifications and variations of the present invention are possible in the light of the above teachings, and, it is therefore understood that within the scope of the disclosed inventive concept, the invention may be practiced otherwise than specifically described.

What is claimed is:

1. A method of measuring the presence and concentration of trace metals in a sample solution flowing through an active electrode and a reference electrode comprising:

depositing a film of mercury from a plating solution on the inner surface of said active electrode;

feeding a sample solution having said trace metals through said active electrode and said reference electrode;

applying a first potential across said active electrode and said reference electrode;

reducing said trace metals on the mercury film;

scanning a potential gradient across said active electrode with respect to said reference electrode;

stripping away various ones of said trace metals at discrete potential levels within the scanned potential gradient; and monitoring the currents produced at the discrete potential levels to provide an indication of the presence and concentration of the trace metals.

2. A method according to claim 1 further including maintaining said inner surface of said active electrode in a closed circuit during said depositing, feeding, applying, reducing, scanning, stripping and monitoring.

3. A method according to claim 2 in which said depositing includes, flowing a mercury plating solution through said active electrode, coupling a plating potential having the same magnitude as said first potential across said active electrode and said reference electrode, and reducing a mercury film from said active metal plating solution on the inner surface of said reference electrode.

4. A method according to claim 3 further including: removing said mercury plating solution from said active electrode to a reservoir prior to said feeding of said sample solution through said active electrode and said reference electrode.

5. A method according to claim 4 in which said scanning is extended to the stripping potential of said mercury film to oxidize said mercury film on said active electrode.

6. A method according to claim 5 in which the steps of depositing said mercury film and of the extended scanning of said stripping potential are repeated a plurality of times to bring the current attributed to the stripping of said mercury film to the steady state.

7. A method according to claim 6 further including: purging a portion of said sample solution and a portion of said plating solution which were admixed during the transition between the steps of said depositing and said feeding to avoid contaminating said plating solution.

8. A method according to claim 7 in which said removing, said feeding, said applying, said reducing, said scanning, said stripping and said monitoring are repeated to give accurate repeated indications of the presence and concentration of trace metals in said sample solution.

9. A method according to claim 7 in which said feeding is the sequential feeding of a second sample solution, said applying is the sequential applying of said first potential, said reducing is the sequential reducing of trace metals from said second sample solution, said scanning is the sequential scanning of said potential gradient, said stripping is the sequential stripping away of various trace metals, and said monitoring is the sequential monitoring of currents to provide an accurate indication of the presence and concentration of trace metals in said second sample solution without any further modification of said active electrode.

10. An apparatus for measuring the presence and concentration of trace metals in a sample solution comprising:

a source of a mercury plating solution;

means for sensing the presence and concentration of trace metals;

means connected to the sensing means for feeding said sample solution and said plating solution through the sensing means;

first means connected to a container of said sample solution and the plating solution source for alternately coupling each to said sensing means;

second means connected to the feeding means for alternately coupling said feeding means to the sample solution container and said plating solution source;

means connected to said sensing means for depositing a thin film of mercury therein when the first and second coupling means are actuated to connect said plating solution source to said sensing means and said feeding means to said plating solution respectively, and for reducing said trace metals on the mercury film when said first and second coupling means are actuated to connect said sample solution container to said sensing means and said feeding means to said sample solution container, respectively; and means connected to said sensing means for indicating the presence and concentration of trace metals in said sample solution after the mercury film has been deposited and said trace metals have been reduced thereon, and as said sample solution continues to be fed through said sensing means.

11. An apparatus according to claim 10 in which the indicating means includes, means for stripping away various ones of said trace metals and said mercury film at discrete potential levels and, means for monitoring the currents produced at said discrete potential levels thereby providing said indicating of the presence and concentration of the trace metals.

12. An apparatus according to claim 11 in which said first and second coupling means are interconnected for recirculating said sample solution between said sample solution container and said sensing means during the stripping and monitoring thereof by the stripping means and the monitoring means.

13. An apparatus according to claim 12 further including:

means connected to said coupling means for purging any said admixture of said plating solution and said sample solution.

14. An apparatus according to claim 13 further including:

means connected to said first and second coupling means for ensuring a sequential said recycling and recirculation with a minimal admixture of said plating solution and said sample solution.

15. An apparatus according to claim 14 further including:

means for interconnecting the mercury plating source, the sensing means, the feeding means, the first and second coupling means, the depositing means and the purging means in a closed system relationship to reduce the possibility of contaminating the mercury plating solution and the sample solution.

16. An apparatus according to claim 15 in which said sensing means is a tubular graphite electrode and said mercury film is deposited uniformly on the cylindrical inner surface.

17. An apparatus according to claim 16 in which said feeding means is a pump drawing said plating solution and said sample solution through the tubular graphite electrode at a variable, selectable flow rate.

18. An apparatus according to claim 17 in which said first coupling means and said second coupling means are a pair of stopcocks, the stripping means is polarography system, and the monitoring means is a strip chart recorder.

19. An apparatus according to claim 10 in which said first and second coupling means are interconnected for recycling said plating solution between said plating solution source and said sensing means during the depositing of said mercury film.

* * * * *